United States Patent
Carmi (10) Patent No.: US 12,347,108 B2
(45) Date of Patent: Jul. 1, 2025

(54) SYSTEM AND METHOD FOR FOLLOW-UP LOCAL FEATURE MATCHING BASED ON MULTIPLE FUNCTIONAL-ANATOMICAL FEATURE LAYERS

(71) Applicant: GE PRECISION HEALTHCARE LLC, Wauwatosa, WI (US)

(72) Inventor: Raz Carmi, Haifa (IL)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 787 days.

(21) Appl. No.: 17/569,180

(22) Filed: Jan. 5, 2022

(65) Prior Publication Data
US 2023/0215008 A1 Jul. 6, 2023

(51) Int. Cl.
*G06T 7/00* (2017.01)
*G06V 10/44* (2022.01)

(52) U.S. Cl.
CPC .......... *G06T 7/0016* (2013.01); *G06V 10/443* (2022.01); *G06T 2207/30004* (2013.01); *G06V 2201/03* (2022.01)

(58) Field of Classification Search
CPC .......... G06T 7/0012; G06T 7/14; G06T 7/16; G06V 2201/031
See application file for complete search history.

(56) References Cited

U.S. PATENT DOCUMENTS

| | | | |
|---|---|---|---|
| 6,067,373 A * | 5/2000 | Ishida | G06T 7/337 378/98.12 |
| 8,160,314 B2 | 4/2012 | Ramamurthy et al. | |
| 10,861,175 B1 * | 12/2020 | Monaghan | G06V 20/698 |
| 2001/0048758 A1 * | 12/2001 | Oosawa | G06V 10/7515 382/132 |
| 2009/0214091 A1 * | 8/2009 | Kawamura | G06T 7/337 382/209 |
| 2016/0063702 A1 * | 3/2016 | Yang | G06T 7/246 382/103 |
| 2018/0314906 A1 * | 11/2018 | Yang | G06V 10/462 |
| 2022/0156904 A1 * | 5/2022 | Manhart | A61B 5/0033 |
| 2023/0351600 A1 * | 11/2023 | Jing | G06T 7/33 |

* cited by examiner

*Primary Examiner* — Wen W Huang
(74) *Attorney, Agent, or Firm* — Fletcher Yoder, P.C.

(57) ABSTRACT

A method includes obtaining functional and anatomical image data sets from a subject acquired at different dates. The method includes receiving a volumetric coordinate of interest in a specified functional and anatomical image data set. The method includes generating a 3D feature matching map for at least one functional feature layer type and for at least one anatomical feature layer type for each non-specified functional and anatomical image data set relative to the specified functional and anatomical image data set utilizing the volumetric coordinate of interest. The method includes generating a best matching coordinate and a corresponding confidence metric value for each 3D feature matching map. The method includes calculating an optimal matching coordinate to the volumetric coordinate of interest based on the best matching coordinates and their corresponding confidence metric values and outputting a respective optimal matching coordinate for each of the non-specified functional and anatomical image data sets.

20 Claims, 5 Drawing Sheets

SYSTEM AND METHOD FOR FOLLOW-UP LOCAL FEATURE MATCHING BASED ON MULTIPLE FUNCTIONAL-ANATOMICAL FEATURE LAYERS

BACKGROUND

The subject matter disclosed herein relates to medical imaging and, more particularly, to medical image feature matching.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

It may be desirable to utilize both functional image data and anatomical image data in analyzing a patient/object. In functional-anatomical medical imaging modalities, such as single photon emission computed tomography (SPECT)-computed tomography (CT), positron emission tomography (PET)-CT, and PET-magnetic resonance imaging (MRI), it is common to perform follow-up studies involving at least two scans of the same patient acquired at different times (e.g., days, weeks, or months apart). For example, these follow-up studies may be performed to look at the physiological response to a certain medical treatment and to help plan further patient management. In the analysis of follow-up scans, the reviewer/physician typically compares the image values on relevant tissue regions or organs and assesses the radiotracer activity differences or changes in the anatomical or structural characteristics. For example, if an identified lesion shows significantly reduced tracer uptake or reduced volume after a therapy course, this may indicate a good response to the therapy procedure. Alternatively, if the lesion shows increased tracer uptake, volume enlargement, or noticeable tissue heterogeneity, this may indicate no response and a progressive disease (i.e., medical condition deterioration).

In assisting computerized algorithms and applications for clinical follow-up analysis, a common challenging task is to propagate, automatically and accurately, marked functional or anatomical image features (e.g., lesions) on one scan to the correct matched spatial coordinates in all the other follow-up scans. The source of the problem is that the successive follow-up medical images can be very different along the prolonged study duration (typically months apart), both in the functional and anatomical features and structures, as well as in the patient posture and positioning on the scanners. This fundamental task is the basis for any further automatic analysis algorithms such as multiple lesion segmentation and quantitative progression assessment.

Regarding image feature matching, various of mathematical techniques and software tools for image registration, or template matching, already exist and are used practically, both on functional and anatomical imaging data. However, these techniques may be insufficient for the aforementioned task and conditions. Moreover, due to the potentially very large image differences, it is impossible to know in advance in which regions specific functional or anatomical information (or their combination) will provide the optimal spatial matching. From a clinical perspective, it is also important to deal with any kind of image feature of interest, and not just point-like or blob-like lesions.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method for follow-up local feature matching is provided. The method includes obtaining, via a processor, a plurality of functional and anatomical image data sets from a subject, each functional and anatomical image data set being acquired at a different date and including a functional image volume and a corresponding anatomical image volume. The method also includes receiving, via the processor, a first volumetric coordinate of interest in a specified functional and anatomical image data set from among the plurality of functional and anatomical image data sets. The method further includes generating, via the processor, a three-dimensional (3D) feature matching map for at least one functional feature layer type and for at least one anatomical feature layer type for each non-specified functional and anatomical image data set of the plurality of functional and anatomical image data sets relative to the specified functional and anatomical image data set utilizing the first volumetric coordinate of interest. The method still further includes generating, via the processor, a best matching coordinate and a corresponding confidence metric value for each 3D feature matching map. The method yet further includes calculating, via the processor, a first optimal matching coordinate to the first volumetric coordinate of interest based on the best matching coordinates and their corresponding confidence metric values for each non-specified functional and anatomical image data set of the plurality of functional and anatomical image data sets relative to the specified functional and anatomical image data set. The method even further includes outputting, via the processor, a respective first optimal matching coordinate for each of the non-specified functional and anatomical image data sets.

In another embodiment, a system for follow-up local feature matching is provided. The system includes a memory encoding processor-executable routines. The system also includes a processor configured to access the memory and to execute the processor-executable routines, wherein the routines, when executed by the processor, cause the processor to perform actions. The actions include obtaining a plurality of functional and anatomical image data sets from a subject, each functional and anatomical image data set being acquired at a different date and including a functional image volume and a corresponding anatomical image volume. The actions also include receiving a first volumetric coordinate of interest in a specified functional and anatomical image data set from among the plurality of functional and anatomical image data sets. The actions further include generating a 3D feature matching map for at least one functional feature layer type and for at least one anatomical feature layer type for each non-specified functional and anatomical image data set of the plurality of functional and anatomical image data sets relative to the specified functional and anatomical image data set utilizing the first volumetric coordinate of interest. The actions still further include generating a best matching coordinate and a corresponding confidence metric value for each 3D feature matching map. The actions yet further include calculating a first optimal matching coordinate to the first volumetric coordinate of interest based on the best matching coordinates and their corresponding confidence metric values for each non-specified functional and anatomical image data set of the plurality of functional and anatomical image data sets relative to the specified functional and anatomical image data set. The actions even further include outputting a respective first optimal matching coordinate for each of the non-specified functional and anatomical image data sets.

In a further embodiment, a non-transitory computer-readable medium is provided. The computer-readable medium includes processor-executable code that when executed by a processor, causes the processor to perform actions. The actions include obtaining a plurality of functional and anatomical image data sets from a subject, each functional and anatomical image data set being acquired at a different date and including a functional image volume and a corresponding anatomical image volume. The actions also include receiving a first volumetric coordinate of interest in a specified functional and anatomical image data set from among the plurality of functional and anatomical image data sets. The actions further include generating a 3D feature matching map for at least one functional feature layer type and for at least one anatomical feature layer type for each non-specified functional and anatomical image data set of the plurality of functional and anatomical image data sets relative to the specified functional and anatomical image data set utilizing the first volumetric coordinate of interest. The actions still further include generating a best matching coordinate and a corresponding confidence metric value for each 3D feature matching map. The actions yet further include calculating a first optimal matching coordinate to the first volumetric coordinate of interest based on the best matching coordinates and their corresponding confidence metric values for each non-specified functional and anatomical image data set of the plurality of functional and anatomical image data sets relative to the specified functional and anatomical image data set. The actions even further include outputting a respective first optimal matching coordinate for each of the non-specified functional and anatomical image data sets.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As utilized herein, "functional medical imaging" relates to revealing physiological activities within a certain tissue or organ by employing medical image modalities (e.g., PET, SPECT, CT perfusion imaging, functional MRI) that often utilize tracers or probes to reflect spatial distribution of them within the body. As utilized herein, "anatomical medical imaging" or "structural medical imaging" relates to the visualization and analysis of anatomical properties of a certain tissue or organ utilizing certain medical image modalities (e.g., CT, structural MRI, diffused-based MRI).

The present disclosure provides systems and methods for follow-up local feature matching. In particular, the disclosed embodiments provide local feature mapping in follow-up studies of a patient utilizing image data acquired with functional and medical imaging modalities (e.g., SPECT-CT, PET-CT, etc.) on different dates. The disclosed embodiments provide for an accurate and fast follow-up local feature matching (e.g., via a local feature matching algorithm), which may be utilized in various clinical analysis applications of follow-up functional-anatomical medical imaging or as a standalone assisting tool. For example, a reviewer identifies and marks (via an input received by a processing device) an image feature (e.g., region of interest (ROI)) of clinical interest in one of the patient follow-up scans (e.g., in the functional image volume or in the anatomical image volume of a functional and anatomical image data set). The algorithm tackles the challenging task of automatically propagating the marked functional or anatomical feature to all other follow-up scans, even in difficult cases where the successive medical images are very different along the prolonged study duration. The principle is to build multiple local feature matching maps corresponding to different feature layer types, and to determine the optimal spatial feature match based on relations between the multiple maps. The different feature layers are based on selective information from the functional or anatomical image data. The disclosed embodiments may be applied interactively within the clinical analysis workflow. The disclosed embodiments enable a ROI localized in one examination to be transposed into the other examinations without having to change the other examinations (e.g., align via translations and/or rotations prior to selection of the ROI), thus, avoiding distortions or errors associated with aligning the examinations.

Figure 1:
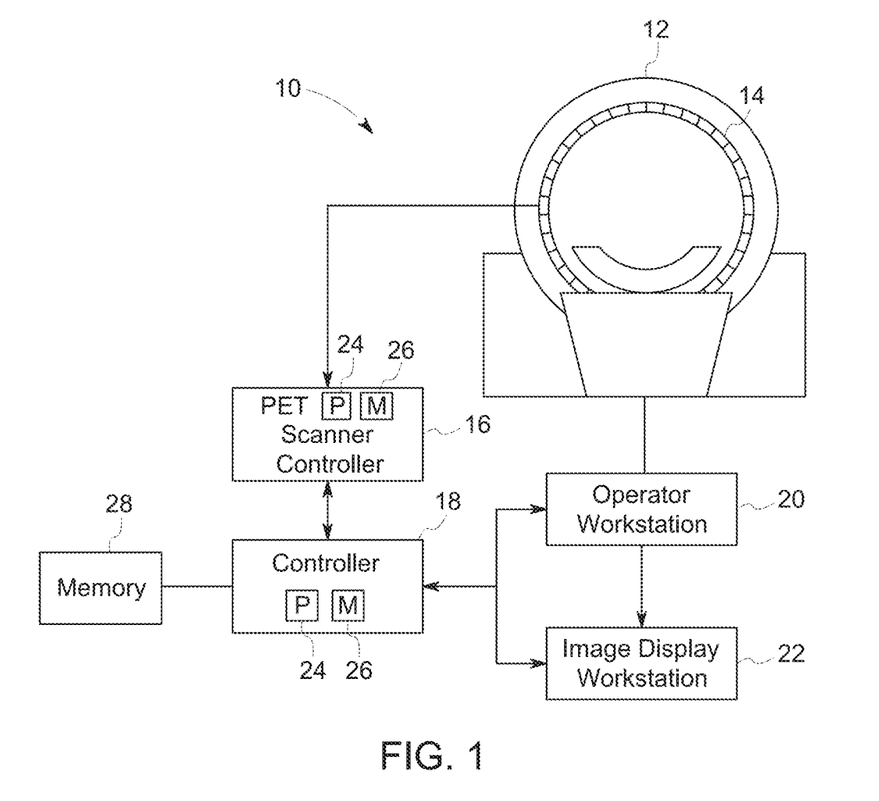
FIG. 1 is a diagrammatical representation of an embodiment of a PET imaging system in accordance with aspects of the present disclosure.

With the foregoing in mind and turning now to the drawings, FIG. 1 depicts a PET or SPECT system 10 operating in accordance with certain aspects of the present disclosure. The PET or SPECT imaging system of FIG. 1 may be utilized with a dual-modality imaging system such as a PET-CT imaging system described in FIG. 2 or a PET-MRI imaging system described in FIG. 3.

Returning now to FIG. 1, the depicted PET or SPECT system 10 includes a detector 12 (or detector array). The detector 12 of the PET or SPECT system 10 typically includes a number of detector modules or detector assemblies (generally designated by reference numeral 14) arranged in one or more rings, as depicted in FIG. 1, each detector assembly 14 includes multiple detector units (e.g., 3 to 5 detector units or more). The depicted PET or SPECT system 10 also includes a PET scanner controller 16, a controller 18, an operator workstation 20, and an image display workstation 22 (e.g., for displaying an image). In certain embodiments, the PET scanner controller 16, controller 18, operator workstation 20, and image display workstation 22 may be combined into a single unit or device or fewer units or devices.

The PET scanner controller 16, which is coupled to the detector 12, may be coupled to the controller 18 to enable the controller 18 to control operation of the PET scanner controller 16. Alternatively, the PET scanner controller 16 may be coupled to the operator workstation 20 which controls the operation of the PET scanner controller 16. In operation, the controller 18 and/or the workstation 20 controls the real-time operation of the PET system or SPECT system 10. In certain embodiments the controller 18 and/or the workstation 20 may control the real-time operation of another imaging modality (e.g., the CT imaging system in FIG. 2) to enable the simultaneous and/or separate acquisition of image data from the different imaging modalities. One or more of the PET scanner controller 16, the controller 18, and/or the operation workstation 20 may include a processor 24 and/or memory 26. In certain embodiments, the PET or SPECT system 10 may include a separate memory 28. The detector 12, PET scanner controller 16, the controller 18, and/or the operation workstation 20 may include detector acquisition circuitry for acquiring image data from the detector 12, image reconstruction and processing circuitry for image processing, and/or circuitry for regulating the temperature of the detector units of the detector assemblies 14 (e.g., independently regulating the temperature of each detector assembly 14). The circuitry may include specially programmed hardware, memory, and/or processors.

The processor 24 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 24 may include one or more reduced instruction set (RISC) processors or complex instruction set (CISC) processors. The processor 24 may execute instructions to carry out the operation of the PET or SPECT system 10. These instructions may be encoded in programs or code stored in a tangible non-transitory computer-readable medium (e.g., an optical disc, solid state device, chip, firmware, etc.) such as the memory 26, 28. In certain embodiments, the memory 26 may be wholly or partially removable from the controller 16, 18.

By way of example, PET imaging is primarily used to measure metabolic activities that occur in tissues and organs and, in particular, to localize aberrant metabolic activity. In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits positrons that interact with and annihilate complementary electrons to generate pairs of gamma rays. In each annihilation reaction, two gamma rays traveling in opposite directions are emitted. In a PET imaging system 10, the pair of gamma rays are detected by the detector array 12 configured to ascertain that two gamma rays detected sufficiently close in time are generated by the same annihilation reaction. Due to the nature of the annihilation reaction, the detection of such a pair of gamma rays may be used to determine the line of response along which the gamma rays traveled before impacting the detector, allowing localization of the annihilation event to that line. By detecting a number of such gamma ray pairs, and calculating the corresponding lines traveled by these pairs, the concentration of the radioactive tracer in different parts of the body may be estimated and a tumor, thereby, may be detected. Therefore, accurate detection and localization of the gamma rays forms a fundamental and foremost objective of the PET system 10.

Figure 2:
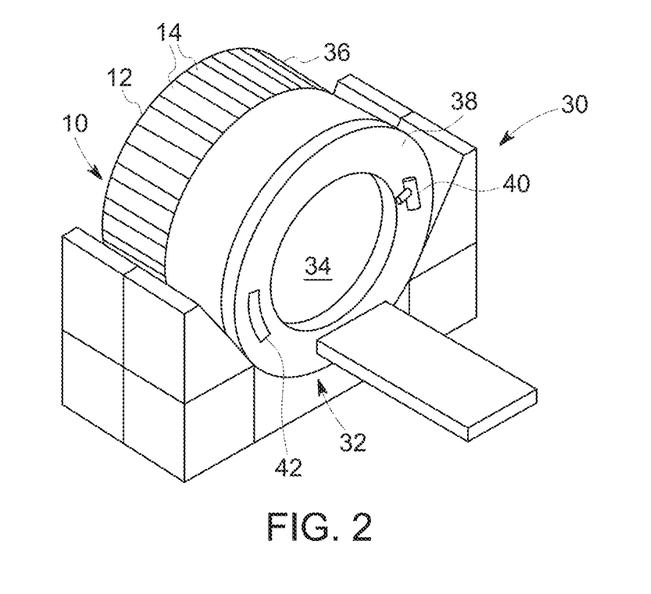
FIG. 2 is a perspective view of a PET-CT imaging system having the PET imaging system of FIG. 1.

As mentioned above, the PET or SPECT system 10 may be incorporated into a dual-modality imaging system such as the PET-CT imaging system 30 in FIG. 2. Referring now to FIG. 2, the PET-CT imaging system 30 includes the PET system 10 and a CT system 32 positioned in fixed relationship to one another. The PET system 10 and CT system 32 are aligned to allow for translation of a patient (not shown) therethrough. In use, a patient is positioned within a bore 34 of the PET-CT imaging system 30 to image a region of interest of the patient as is known in the art.

The PET system 10 includes a gantry 36 that is configured to support a full ring annular detector array 12 thereon (e.g., including the plurality of detector assemblies 14 in FIG. 1). The detector array 12 is positioned around the central opening/bore 34 and can be controlled to perform a normal "emission scan" in which positron annihilation events are counted. To this end, the detectors 14 forming array 12 generally generate intensity output signals corresponding to each annihilation photon.

The CT system 32 includes a rotatable gantry 38 having an X-ray source 40 thereon that projects a beam of X-rays toward a detector assembly 42 on the opposite side of the gantry 38. The detector assembly 42 senses the projected X-rays that pass through a patient and measures the intensity of an impinging X-ray beam and hence the attenuated beam as it passes through the patient. During a scan to acquire X-ray projection data, gantry 38 and the components mounted thereon rotate about a center of rotation. In certain embodiments, the CT system 32 may be controlled by the controller 18 and/or operator workstation 20 described in FIG. 2. In certain embodiments, the PET system 10 and the CT system 32 may share a single gantry. Image data may be acquired simultaneously and/or separately with the PET system 10 and the CT system 32.

Figure 3:
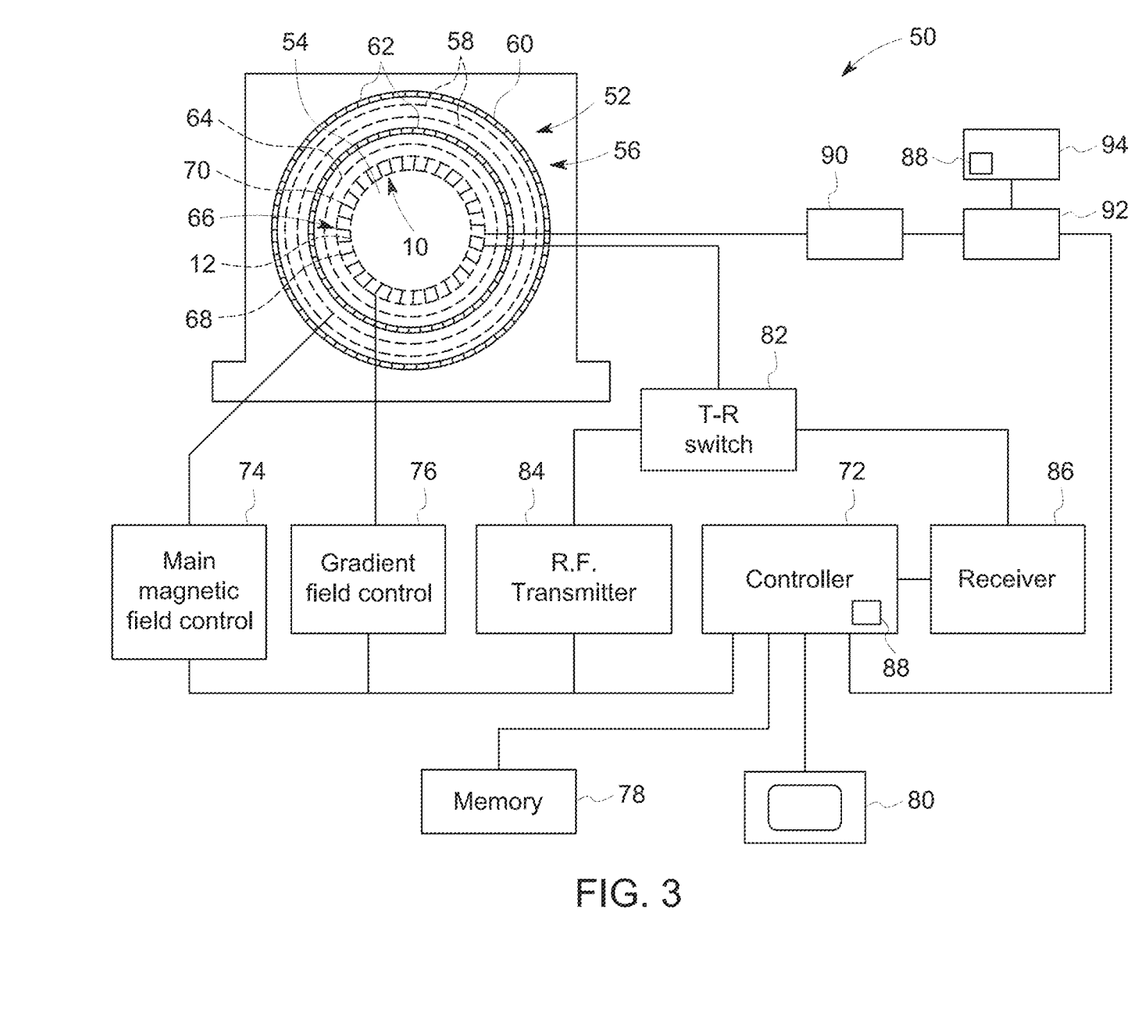
FIG. 3 is a perspective view of a PET-MRI imaging system having the PET imaging system of FIG. 1.

As mentioned above, the PET or SPECT system 10 may be incorporated into a dual-modality imaging system such as the PET-MRI imaging system 50 in FIG. 3. Referring now to FIG. 3, the PET-MRI imaging system 50 includes the PET system 10 and a MRI system 52 positioned in fixed relationship to one another. The PET system 10 and MRI system 52 are aligned to allow for translation of a patient (not shown) therethrough. In use, a patient is positioned within a bore 54 of the PET-CT imaging system 50 to image a region of interest of the patient as is known in the art. Image data may be acquired simultaneously and/or separately with the PET system 10 and the MRI system 52.

The PET-MRI imaging system 50 that includes a superconducting magnet assembly 56 that includes a superconducting magnet 58. The superconducting magnet 58 is formed from a plurality of magnetic coils supported on a magnet coil support or coil former. In one embodiment, the superconducting magnet assembly 56 may also include a thermal shield 60. A vessel 62 (also referred to as a cryostat) surrounds the superconducting magnet 58, and the thermal shield 60 surrounds the vessel 62. The vessel 62 is typically filled with liquid helium to cool the coils of the superconducting magnet 58. A thermal insulation (not shown) may be provided surrounding the outer surface of the vessel 62. The imaging system 50 also includes a main gradient coil 64, and the RF coil assembly 60 described above that is mounted radially inwardly from the main gradient coil 64. As described above, a radio frequency (RF) coil assembly 66 includes the PET detector assembly 12, an RF transmit coil 68 and the RF shield 70. More specifically, the RF coil assembly 66 includes a coil support structure that is used to mount the PET detector assembly 12, the RF transmit coil 68, and the RF shield 70.

In operation, the RF coil assembly 66 enables the imaging system 50 to perform both MRI and PET imaging concurrently because both the RF transmit coil 68 and the PET detector assembly 12 are placed around a patient at the center of the bore of the imaging system 50. Moreover, the PET detector assembly 12 is shielded from the RF transmit coil 68 using the RF shield 70 that is disposed between the RF transmit coil 68 and the PET detector assembly 12. Mounting the PET detector assembly 12, the RF coil 68 and the RF shield 70 on the coil support structure enables the RF coil assembly 66 to be fabricated to have an outside diameter that enables the RF coil assembly 66 to be mounted inside the gradient coil 64. Moreover, mounting the PET detector assembly 12, the RF coil 68 and the RF shield 70 on the coil support structure enables the RF coil assembly 66 to have a relatively large inside diameter to enable the imaging system 50 to image larger patients.

The imaging system 50 also generally includes a controller 72, a main magnetic field control 74, a gradient field control 76, a memory 78, a display device 80, a transmit-receive (T-R) switch 82, an RF transmitter 84, and a receiver 86.

In operation, a body of an object, such as a patient (not shown), or a phantom to be imaged, is placed in the bore 54 on a suitable support, for example, a motorized table (not shown) or the cradle described above. The superconducting magnet 58 produces a uniform and static main magnetic field $B_o$ across the bore 54. The strength of the electromagnetic field in the bore 54 and correspondingly in the patient, is controlled by the controller 72 via the main magnetic field control 74, which also controls a supply of energizing current to the superconducting magnet 58.

The main gradient coil 64, which may include one or more gradient coil elements, is provided so that a magnetic gradient can be imposed on the magnetic field B0 in the bore 54 in any one or more of three orthogonal directions x, y, and z. The main gradient coil 64 is energized by the gradient field control 76 and is also controlled by the controller 72.

The RF coil assembly 66 is arranged to transmit magnetic pulses and/or optionally simultaneously detect MR signals from the patient, if receive coil elements are also provided. The RF coil assembly 66 may be selectably interconnected to one of the RF transmitter 84 or receiver 86, respectively, by the T-R switch 82. The RF transmitter 84 and T-R switch 82 are controlled by the controller 72 such that RF field pulses or signals are generated by the RF transmitter 84 and selectively applied to the patient for excitation of magnetic resonance in the patient.

Following application of the RF pulses, the T-R switch 82 is again actuated to decouple the RF coil assembly 66 from the RF transmitter 84. The detected MR signals are in turn communicated to the controller 72. The controller 72 includes a processor 88 that controls the processing of the MR signals to produce signals representative of an image of the patient. The processed signals representative of the image are also transmitted to the display device 80 to provide a visual display of the image. Specifically, the MR signals fill or form a k-space that is Fourier transformed to obtain a viewable image which may be viewed on the display device 80.

The imaging system 50 also controls the operation of PET imaging. Accordingly, in various embodiments, the imaging system 50 may also include a coincidence processor 90 that is coupled between the detector 12 and a PET scanner controller 92. The PET scanner controller 92 may be coupled to the controller 72 to enable the controller 72 to control the operation of the PET scanner controller 92. Optionally, the PET scanner controller 92 may be coupled to a workstation 94 which controls the operation of the PET scanner controller 92. In operation, the exemplary embodiment, the controller 72 and/or the workstation 94 controls real-time operation of the PET imaging portion of the imaging system 50.

More specifically, in operation, the signals output from the PET detector assembly 12 are input to the coincidence processor 90. In various embodiments, the coincidence processor 90 assembles information regarding each valid coincidence event into an event data packet that indicates when the event took place and the position of a detector that detected the event. The valid events may then be conveyed to the controller 92 and utilized to reconstruct an image. Moreover, it should be realized that images acquired from the MR imaging portion may be overlaid onto images acquired from the PET imaging portion. The controller 72 and/or the workstation 94 may a central processing unit (CPU) or computer 88 to operate various portions of the imaging system 50. As used herein, the term "computer" may include any processor-based or microprocessor-based system configured to execute the methods described herein. Accordingly, the controller 72 and/or the workstation 94 may transmit and/or receive information from the PET detector assembly 12 to both control the operation of the PET detector assembly 12 and to receive information from the PET detector assembly 12.

The various embodiments and/or components, for example, the modules, or components and controllers therein, such as of the imaging system 50, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
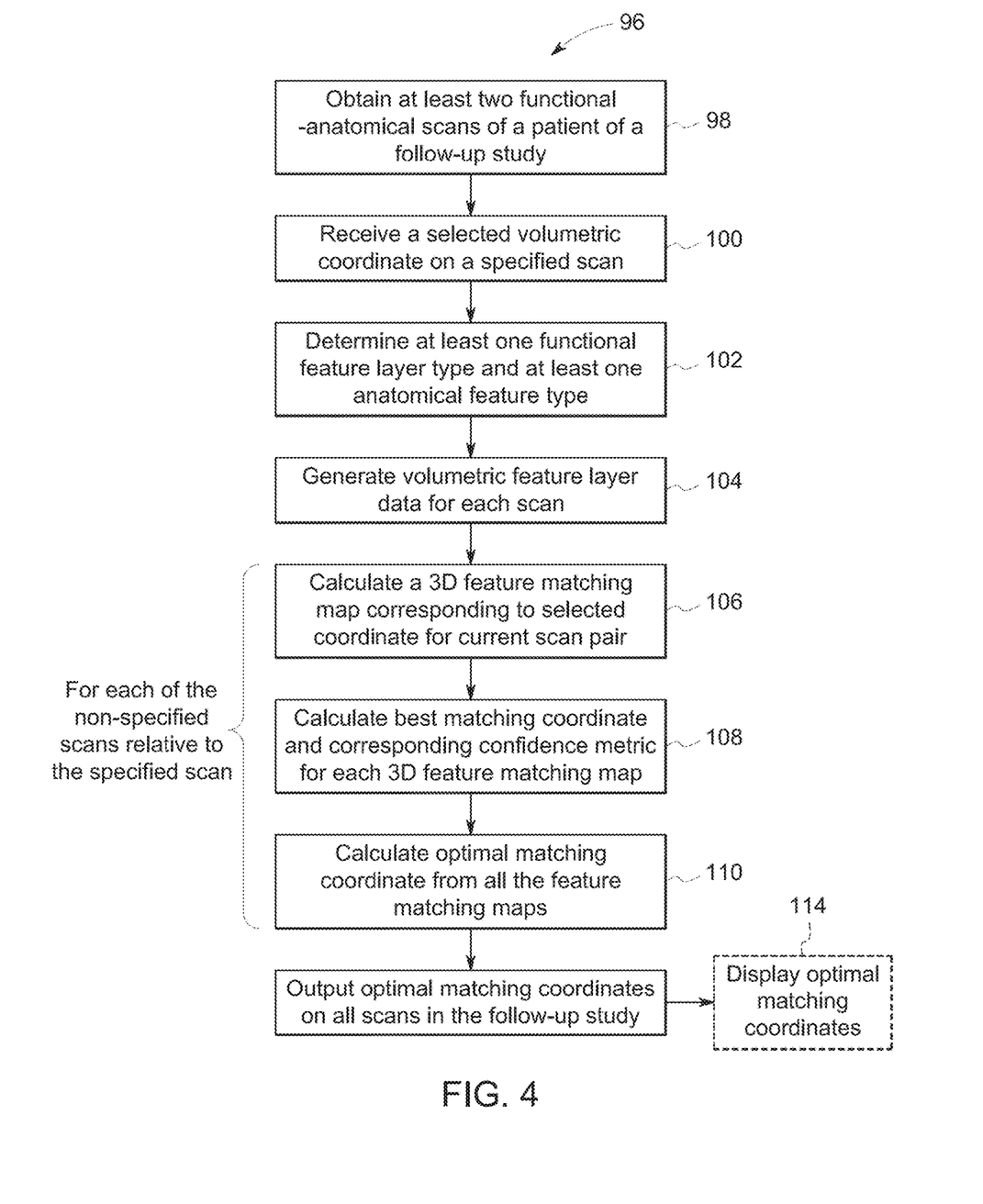
FIG. 4 is a flowchart of an embodiment of a method for follow-up local feature matching, in accordance with aspects of the present disclosure.

FIG. 4 is a flowchart of a method 96 (e.g., follow-up local feature matching algorithm) for follow-up local feature matching. One or more steps of the method 96 may be performed by processing circuitry of the imaging systems discussed above or processing circuitry of a remote computing device having processing circuitry and memory circuitry. One or more of the steps of the method 96 may be performed simultaneously or in a different order from the order depicted in FIG. 4.

The method 96 includes obtaining or accessing a plurality (at least two) of functional and anatomical image data sets from a subject or patient (block 98). Each functional and anatomical image data set includes a reconstructed functional image volume (e.g., PET, SPECT) and a corresponding reconstructed anatomical image volume (e.g., CT, MRI) from a medical imaging procedure or examination. Each functional and anatomical image data set was acquired at respective examinations on different dates. For example, several successive sets of PET and CT image volumes may be acquired on different dates for assessing a medical treatment or disease progression.

In PET, SPECT, CT, and MRI, in certain embodiments, it is possible to perform dynamic contrast agent or dynamic radiotracer imaging and to derive dynamic parametric maps. These parametric maps can provide additional clinical information (e.g., on tumor physiology and response). It is also possible to generate feature layers as discussed herein from such volumetric maps. In certain embodiments, useful clinical information and corresponding feature layers may be derived from texture analysis volumetric maps (e.g., to highlight malignant tumors and lesions).

The method 96 also includes receiving a selected coordinate (e.g. volumetric coordinate) of interest (e.g., a point or single voxel in the imaged volume) in a specified functional and anatomical image data set from among the plurality of functional and anatomical image data sets (block 100). The selected coordinate is on one of either the functional image volume or the anatomical image volume of the specified functional and anatomical image data set. In certain embodiments, the selected coordinate may be obtained from a user via user interface. In certain embodiments, the selected coordinate may be obtained from a dedication algorithm or application. The selected coordinate is typically placed on a relevant clinical feature within the anatomical image volume or the functional image volume. Although the method 96 as described here is for one selected coordinate input, it can be applied for any number of selected coordinates (e.g., in the specified functional and anatomical image data set).

The method 96 further includes determining or deriving at least one functional feature layer type and at least one anatomical feature layer type (block 102). Multiple functional feature layer types and/or anatomical feature layer types may be determined or derived. Each feature layer is intended in advance to highlight a specific type of relevant features, structures, or physiology. A feature layer can be the whole or specific information from the functional or anatomical image data. In general, for all imaging modalities, in certain embodiments, structural segmentation algorithms may refine the specificity of feature layers to a required clinical purpose.

A derived feature layer from PET or SPECT functional imaging can be the image values above a specific threshold that are determined as the estimated background uptake in the body (which by itself can be calculated by a dedicated automatic algorithm), or even by using a pre-determined standardized uptake value (SUV) threshold. This threshold setting can be particularly useful if mutual-information or cross-correlation are used for the matching metric.

One CT feature layer may be the whole (Hounsfield units) HU image value range. Another CT feature layer may be bone structures (as determined above a specific HU threshold, or according to a dedicated automatic segmentation algorithm). A further CT feature layer may be contrast-agent (e.g., iodine) based images. A still further CT feature layer may be structures related to body contours, inner lung contours, or other organs.

One MRI-based feature layer may be the whole image range. Another MRI-based feature layer may be fat-tissue image values. A further MRI-based feature layer may be contrast-agent (e.g., gadolinium) based images. Still further MRI-based feature layers may be dedicated image value ranges related to dynamic or functional MRI protocols.

In certain embodiments, when image thresholds are used to generate a feature layer, low image values may be clipped to a lower threshold (if determined) and high image values clipped to a high threshold (if determined). This keeps undesired sharp structures from being around the threshold value ranges.

The method 96 even further includes generating volumetric feature layer data according to the determined feature layer types for each functional and anatomical image data set (block 104).

The following blocks 106, 108, and 110 of the method 96 occur for each of the non-specified functional and anatomical image data sets relative to the specified functional and anatomical image data set. In other words, each respective non-specified functional and anatomical image data set (for which selected feature position propagation is required) forms a pair (referred to as a current scan pair) with the non-specified functional and anatomical image data set and undergoes the blocks 106, 108, and 110. For example (assuming PET-CT imaging modalities were utilized during examinations), if the selected coordinated is on scan 1 (i.e., the specified functional and anatomical image data set) and the propagation is to be estimated for scan (i.e., one of the non-specified functional and anatomical image data set), two primary feature matching maps that can be calculated are for the PET image values and the CT image values as the feature layers (e.g., utilizing two input image volumes for both layers).

The method 96 still further includes calculating a respective 3D feature matching map between the current scan pair corresponding to the selected volumetric coordinate for each of the determined feature layer types (block 106). The method 96 yet further includes calculating a best matching coordinate and a corresponding confidence metric for each calculated 3D feature matching map (block 108). The best matching coordinate and a corresponding confidence metric is calculated for each 3D feature matching map. The best matching can be determined for example by finding the maximum in the map or by finding the center of mass applied on only high map values above a certain threshold. It is also possible in this process to apply techniques to reduce noise and artifacts from the evaluated map. The confidence metric can be determined, for example, by the average peak width around the maximum, by the contrast ratio between the peak to the surrounding background or noise, or by analysis of the map histogram. In certain embodiments, the confidence metric can be different for the functional and anatomical image (e.g., due to spatial resolution and contrast differences). In certain embodiments, the different metric results may be calibrated or normalized to be comparable.

The method 96 still further includes calculating (one scan pair at a time) the optimal matching coordinate (for the current scan pair) from all the 3D feature matching maps (for the current scan pair) based on their best matching coordinates and corresponding confidence metric values (block 110). In certain embodiments, one approach is to select for the final coordinate (i.e., the coordinate from the map with the highest confidence level). Another option is to take the average coordinate among maps which receive sufficiently high confidence levels. Moreover, the way of calculating the optimal matching coordinate from the different maps can utilize a complicated learned function (e.g., using machine learning). Another option includes first finding the optimal match as described, and then do another iteration on the whole feature layer types with a narrower scanning range around the first match (may better match lesions on PET images), or just find the maximum on PET in the second iteration.

The method 96 includes outputting an optimal matching coordinate for each of the non-specified functional and anatomical image data sets that corresponds to volumetric coordinate of interest in the specified functional and anatomical image data set (block 112). In certain embodiments, the method 96 may be repeated for additional volumetric coordinates of interest. In certain embodiments, the method 96 also includes displaying the selected coordinate of interest with the specified functional and anatomical image data set and/or the respective optimal coordinate with each respective non-specified functional and anatomical image data set (block 114). The results can be visualized on a display (e.g., in a user interface) for a user to perceive. The outputs or results may be utilized in further relevant algorithms and applications or a standalone assisting tool on a clinical viewer.

Figure 5:
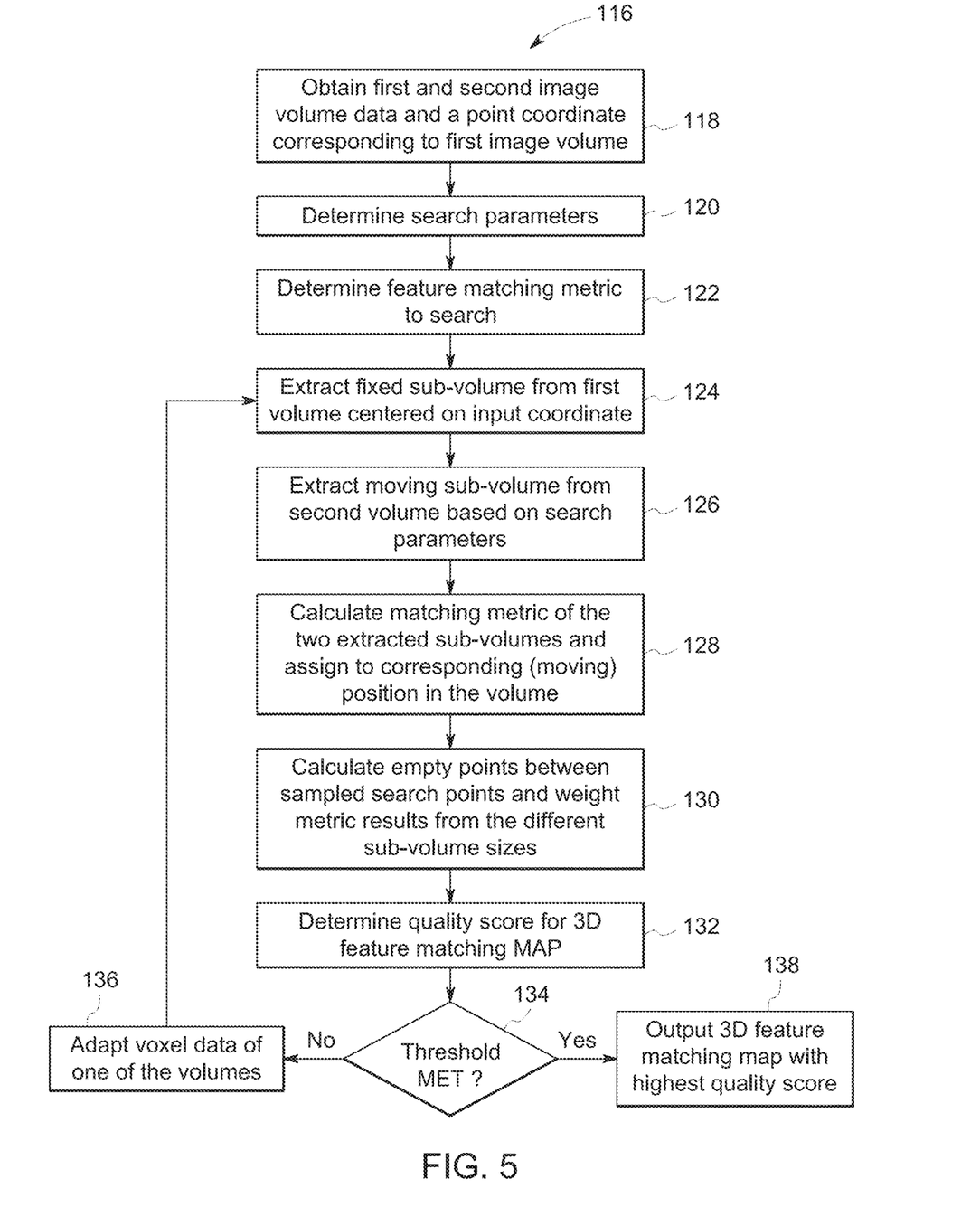
FIG. 5 is a flowchart of an embodiment of a method for calculating a 3D feature matching map, in accordance with aspects of the present disclosure.

FIG. 5 is a flowchart of an embodiment of a method 116 for calculating a 3D feature matching map (e.g., block 106 in the method 96). One or more steps of the method 114 may be performed by processing circuitry of the imaging systems discussed above or processing circuitry of a remote computing device having processing circuitry and memory circuitry. One or more of the steps of the method 116 may be performed simultaneously or in a different order from the order depicted in FIG. 5. The method 116 illustrates one workflow providing a preferable approach to mathematically calculating the 3D feature matching map. Additional or alternative algorithmic options, optimization, and modifications may be utilized.

The method 116 is for calculating a 3D feature matching map for a given feature layer type and a corresponding selected volumetric coordinate for a one current scan pair (i.e., the specified functional and anatomical image data set and one of the non-specified functional and anatomical image data set). The method 116 includes obtaining a first image volume data and a second image volume data along with a selected volumetric coordinate of interest in the first image volume data (block 118). The first image volume data is a feature layer type from the specified functional and anatomical image data set and the second image volume data is the same feature layer type of one of the non-specified functional and anatomical image data sets. The feature layer type may be a functional feature layer type or an anatomical feature layer type.

The method 116 also includes determining search parameters for a spatial search (block 120). The search parameters may include sub-volume (voxel box) sizes, spatial search ranges, and search or scanning steps. Each of these parameters are configurable. In certain embodiments, the box may be determined automatically based on the marked feature and the scanning range may be adjusted accordingly.

The method 116 further includes determining a feature matching metric (e.g., dedicated feature matching metric) to search (block 122). The determination of the feature matching metric may be determined based on sum of square differences (SSD), mutual-information, or cross-correlation.

The method 116 still further includes extracting a fixed sub-volume (fixed voxel box) form the first image volume data centered on the selected coordinate of interest (block 124). The method 116 even further includes extracting a moving sub-volume (moving voxel box) (e.g., within a search loop) from the second image volume data based on the determined search parameters (block 126).

The method 116 yet further includes calculating the matching metric of the two extracted sub-volumes (i.e., the fixed voxel box and the moving voxel box) and assigning the value of the matching metric to the corresponding (i.e., moving) position in the volume (of the 3D feature matching map) (block 128). Blocks 126 and 128 are repeated for different positions for the moving sub-volume during scanning. While scanning over the scan range, the respective calculated matching metric value is added to the corresponding (moving) position in the 3D feature matching map.

The method 116 still further includes (after scanning is completed) completing empty points (which were skipped for efficiency) between the sampled search points and weighting the metric results (i.e., matching metric values) from the different sub-volume sizes (block 130). In certain embodiments, completion of the empty point may occur utilizing common interpolation procedures. In certain embodiments, after the completion of the empty points but prior to the weighting, the points may be smoothed out.

In certain embodiments, the method 116 includes determining a quality score for the 3D feature matching map (block 132). Whether or not a quality score is determined is based on the determined matching metric. The method 116 includes determining if the quality score meets a quality threshold (134). If the quality score for the 3D feature matching map does not meet the quality threshold (e.g., falls below the threshold), the method 116 includes adapting the voxel data of one of the volumes (block 136) and repeating the method 116 starting at block 124. Modifying one of the volumes may include multiplying by a factor (e.g., 0.5, 2, etc.) and then repeating the range scanning. If the quality score for the 3D feature matching map is met, the method 116 includes outputting the 3D feature matching map (i.e., final 3D feature matching map) with the highest quality score (if quality scores are determined) (block 138).

The described approach in the method 116 is a straightforward efficient calculation. The strength of the method 116 is applying this efficient calculation on several different feature layers and weighting them together as described above. In certain embodiments, the method 116 may also include components such as image scales, an image pyramid, and pre-global registration. In addition, in certain embodiments, the method 116 may include matching with sub-volume rotation and scaling (not just translation).

Figure 6:
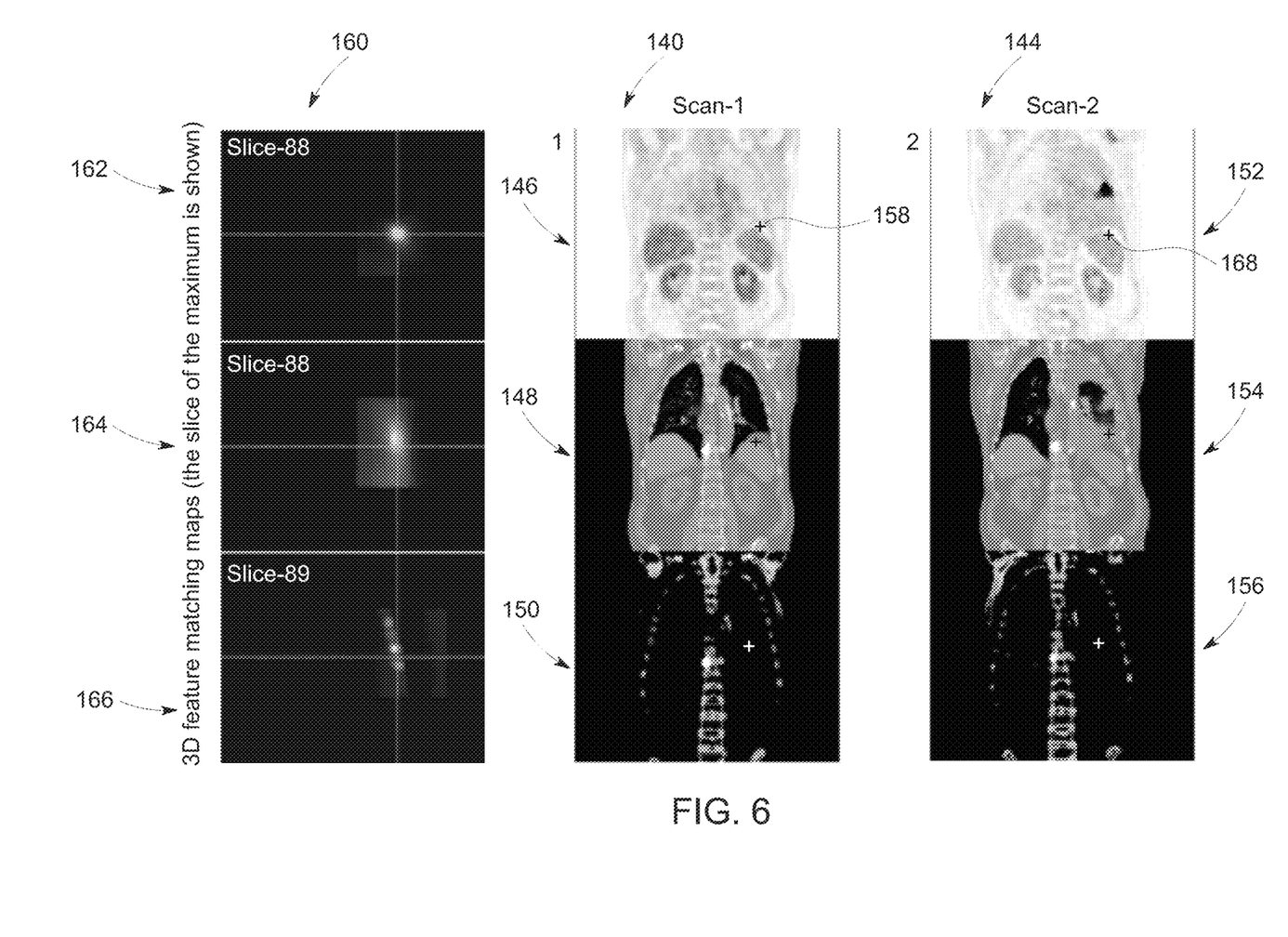
FIG. 6 illustrates 3D feature matching maps calculated for different feature layers, in accordance with aspects of the present disclosure.

FIG. 6 illustrates 3D feature matching maps calculated for different feature layers utilizing the techniques (e.g., algorithm) discussed above. Column 140 includes feature layers derived from functional-anatomical image data acquired during a first scan for a patient. Column 144 includes feature layers derived from functional-anatomical image subsequently acquired during a second scan on the same patient on a later and different date from the first scan. In column 140, feature layer 146 is a functional feature layer that includes PET image values; feature 148 is an anatomical feature layer that includes whole CT image values; and feature 150 is a functional feature layer that includes CT bone (e.g., above 95 HU). In column 144, feature layer 152 is a functional feature layer that includes PET image values; feature 154 is an anatomical feature layer that includes whole CT image values; and feature 156 is a functional feature layer that includes CT bone (e.g., above 95 HU). A marker 158 was placed in the image volume in scan-1 (e.g., via a user interface tool). The marker 158 is seen in each of the feature layers 146, 148, 150 of scan-1. The marker coordinate (for the marker 158) was selected as a reference and needed to be propagated to scan-2. Automatically the algorithm, discussed above, calculated the 3D featuring matching maps (as seen in column 160). All calculations were done in 3D. Column 160 includes the 3D feature matching map 162 for the feature layers 146, 152; the 3D feature matching map 164 for the feature layers 148, 154; and the 3D feature matching map 166 for the feature layers 150, 156. The best match (as calculated by the algorithm) is indicated by marker 168 in feature layers 152, 154, 156 of scan-2. For each feature layer, the feature matching map is shown on the slice with the maximal value.

In the examples in FIG. 6, different kinds of image features were selected (i.e., not only lesions or those with diagnostic relevance). The examples in FIG. 6 demonstrate that the map results where the differences on both the PET and the CT are large and the optimal match result has not been selected yet. Selecting the final optimal match can be done in several ways. Visually, the optimal match can usually be found with one, two, or three map results. In certain embodiments, the at least one of the maps does not give an accurate solution. In FIG. 6, the 3D featuring matching map 162 for the feature layers 146, 152 has the best result (as indicated by accuracy and sharpness of the result).

Technical effects of the disclosed embodiments include providing systems and methods for follow-up local feature matching. In particular, the disclosed embodiments provide local feature mapping in follow-up studies of a patient utilizing image data acquired with functional and medical imaging modalities on different dates. The disclosed embodiments provide for an accurate and fast follow-up local feature matching (e.g., via a local feature matching algorithm), which may be utilized in various clinical analysis applications of follow-up functional-anatomical medical imaging or as a standalone assisting tool. The algorithm tackles the challenging task of automatically propagating the marked functional or anatomical feature to all other follow-up scans, even in difficult cases where the successive medical images are very different along the prolonged study duration. The disclosed embodiments may be applied interactively within the clinical analysis workflow. The disclosed embodiments enable a ROI localized in one examination to be transposed or propagated into the other examinations without having to change the other examinations (e.g., align via translations and/or rotations prior to selection of the ROI), thus, avoiding distortions or errors associated with aligning the examinations.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for follow-up local feature matching, comprising:
    obtaining, via a processor, a plurality of functional and anatomical image data sets from a subject, each functional and anatomical image data set being acquired at a different date and comprising a functional image volume and a corresponding anatomical image volume;
    receiving, via the processor, a first volumetric coordinate of interest in a specified functional and anatomical image data set from among the plurality of functional and anatomical image data sets;
    generating, via the processor, a three-dimensional (3D) feature matching map for at least one functional feature layer type and for at least one anatomical feature layer type for each non-specified functional and anatomical image data set of the plurality of functional and anatomical image data sets relative to the specified functional and anatomical image data set utilizing the first volumetric coordinate of interest;
    generating, via the processor, a best matching coordinate and a corresponding confidence metric value for each 3D feature matching map;
    calculating, via the processor, a first optimal matching coordinate to the first volumetric coordinate of interest based on the best matching coordinates and their corresponding confidence metric values for each non-specified functional and anatomical image data set of the plurality of functional and anatomical image data sets relative to the specified functional and anatomical image data set; and
    outputting, via the processor, a respective first optimal matching coordinate for each of the non-specified functional and anatomical image data sets.

2. The method of claim 1, comprising:
    receiving, via the processor, a second volumetric coordinate of interest in the specified functional and anatomical image data set;
    generating, via the processor, the 3D feature matching map for the at least one functional feature layer type and for the at least one anatomical feature layer type for each non-specified functional and anatomical image data set of the plurality of functional and anatomical image data sets relative to the specified functional and anatomical image data set utilizing the second volumetric coordinate of interest;
    generating, via the processor, the best matching coordinate and the corresponding confidence metric value for each 3D feature matching map;
    calculate, via the processor, a second optimal matching coordinate to the second volumetric coordinate of interest based on the best matching coordinates and their corresponding confidence metric values for each non-specified functional and anatomical image data set of the plurality of functional and anatomical image data sets relative to the specified functional and anatomical image data set; and
    output, via the processor, a respective second optimal matching coordinate for each of the non-specified functional and anatomical image data sets.

3. The method of claim 1, comprising determining the at least one functional feature layer type and the at least one anatomical feature layer type.

4. The method of claim 1, wherein the first volumetric coordinate of interest is in one of either the functional image volume or the corresponding anatomical image volume of the specified functional and anatomical image data set.

5. The method of claim 1, wherein the at least one functional feature layer type and the at least one anatomical feature layer type each comprises an entirety of image data or a portion of the image data above a threshold.

6. The method of claim 1, comprising displaying, via the processor, the first volumetric coordinate of interest with the specified functional and anatomical image data set and displaying both the first volumetric coordinate of interest and respective optimal matching coordinate with each non-specified functional and anatomical image data set on a display.

7. The method of claim 1, wherein calculating the first optimal matching coordinate is based on the best matching coordinates and their corresponding confidence metric values of all generated 3D feature matching maps for a respective non-specified functional and anatomical image data set of the plurality of functional and anatomical image data sets relative to the specified functional and anatomical image data set.

8. The method of claim 1, wherein generating the 3D feature matching map for the at least one functional feature layer type and for the at least one anatomical feature layer type comprises:
    determining search parameters;
    determining a feature matching metric to search;
    extracting a fixed sub-volume from a first image volume centered on the first volumetric coordinate of interest, wherein the first image volume is from the specified functional and anatomical image data set;
    extracting a plurality of sub-volumes at different positions from a second image volume based on the search parameters, wherein the second image volume is from one of the unspecified functional and anatomical image data set;
    calculating a respective matching metric between the fixed sub-volume and each respective sub-volume of the plurality of sub-volumes and assigning the respective matching metric to a corresponding position in the 3D feature matching map; and
    outputting the 3D feature matching map.

9. The method of claim 8, wherein the first image volume and the second image volume both comprise either the at least one functional feature layer or the at least one anatomical feature layer type.

10. A system for follow-up local feature matching, comprising:
    a memory encoding processor-executable routines;
    a processor configured to access the memory and to execute the processor-executable routines, wherein the routines, when executed by the processor, cause the processor to:
    obtain a plurality of functional and anatomical image data sets from a subject, each functional and anatomical image data set being acquired at a different date and comprising a functional image volume and a corresponding anatomical image volume;
    receive a first volumetric coordinate of interest in a specified functional and anatomical image data set from among the plurality of functional and anatomical image data sets;
    generate a three-dimensional (3D) feature matching map for at least one functional feature layer type and for at least one anatomical feature layer type for each non-specified functional and anatomical image data set of the plurality of functional and anatomical image data sets relative to the specified functional and anatomical image data set utilizing the first volumetric coordinate of interest;

generate a best matching coordinate and a corresponding confidence metric value for each 3D feature matching map;

calculate a first optimal matching coordinate to the first volumetric coordinate of interest based on the best matching coordinates and their corresponding confidence metric values for each non-specified functional and anatomical image data set of the plurality of functional and anatomical image data sets relative to the specified functional and anatomical image data set; and output a respective first optimal matching coordinate for each of the non-specified functional and anatomical image data sets.

11. The system of claim 10, wherein the routines, when executed by the processor, cause the processor to:

receive a second volumetric coordinate of interest in the specified functional and anatomical image data set;

generate the 3D feature matching map for the at least one functional feature layer type and for the at least one anatomical feature layer type for each non-specified functional and anatomical image data set of the plurality of functional and anatomical image data sets relative to the specified functional and anatomical image data set utilizing the second volumetric coordinate of interest;

generate the best matching coordinate and the corresponding confidence metric value for each 3D feature matching map;

calculate a second optimal matching coordinate to the second volumetric coordinate of interest based on the best matching coordinates and their corresponding confidence metric values for each non-specified functional and anatomical image data set of the plurality of functional and anatomical image data sets relative to the specified functional and anatomical image data set; and output a respective second optimal matching coordinate for each of the non-specified functional and anatomical image data sets.

12. The system of claim 10, wherein the first volumetric coordinate of interest is in one of either the functional image volume or the corresponding anatomical image volume of the specified functional and anatomical image data set.

13. The system of claim 10, wherein the routines, when executed by the processor, cause the processor to display the first volumetric coordinate of interest with the specified functional and anatomical image data set and display both the first volumetric coordinate of interest and respective optimal matching coordinate with each non-specified functional and anatomical image data set on a display.

14. The system of claim 10, wherein calculating the first optimal matching coordinate is based on the best matching coordinates and their corresponding confidence metric values of all generated 3D feature matching maps for a respective non-specified functional and anatomical image data set of the plurality of functional and anatomical image data sets relative to the specified functional and anatomical image data set.

15. The system of claim 10, wherein generating the 3D feature matching map for the at least one functional feature layer type and for the at least one anatomical feature layer type comprises:

determining search parameters;

determining a feature matching metric to search;

extracting a fixed sub-volume from a first image volume centered on the first volumetric coordinate of interest, wherein the first image volume is from the specified functional and anatomical image data set;

extracting a plurality of sub-volumes at different positions from a second image volume based on the search parameters, wherein the second image volume is from one of the unspecified functional and anatomical image data set;

calculating a respective matching metric between the fixed sub-volume and each respective sub-volume of the plurality of sub-volumes and assigning the respective matching metric to a corresponding position in the 3D feature matching map; and outputting the 3D feature matching map.

16. The system of claim 15, wherein the first image volume and the second image volume both comprise either the at least one functional feature layer or the at least one anatomical feature layer type.

17. A non-transitory computer-readable medium, the computer-readable medium comprising processor-executable code that when executed by a processor, causes the processor to:

obtain a plurality of functional and anatomical image data sets from a subject, each functional and anatomical image data set being acquired at a different date and comprising a functional image volume and a corresponding anatomical image volume;

receive a first volumetric coordinate of interest in a specified functional and anatomical image data set from among the plurality of functional and anatomical image data sets;

generate a three-dimensional (3D) feature matching map for at least one functional feature layer type and for at least one anatomical feature layer type for each non-specified functional and anatomical image data set of the plurality of functional and anatomical image data sets relative to the specified functional and anatomical image data set utilizing the first volumetric coordinate of interest;

generate a best matching coordinate and a corresponding confidence metric value for each 3D feature matching map;

calculate a first optimal matching coordinate to the first volumetric coordinate of interest based on the best matching coordinates and their corresponding confidence metric values for each non-specified functional and anatomical image data set of the plurality of functional and anatomical image data sets relative to the specified functional and anatomical image data set; and output a respective first optimal matching coordinate for each of the non-specified functional and anatomical image data sets.

18. The non-transitory computer-readable medium of claim 17, wherein the first volumetric coordinate of interest is in one of either the functional image volume or the corresponding anatomical image volume of the specified functional and anatomical image data set.

19. The non-transitory computer-readable medium of claim 17, wherein calculating the first optimal matching coordinate is based on the best matching coordinates and their corresponding confidence metric values of all generated 3D feature matching maps for a respective non-specified functional and anatomical image data set of the plurality of functional and anatomical image data sets relative to the specified functional and anatomical image data set.

20. The non-transitory computer-readable medium of claim 17, wherein the processor-executable code, when executed by the processor, cause the processor to display the first volumetric coordinate of interest with the specified functional and anatomical image data set and display both the first volumetric coordinate of interest and respective optimal matching coordinate with each non-specified functional and anatomical image data set on a display.

\* \* \* \* \*